United States Patent
Hutton et al.

(10) Patent No.: US 7,577,795 B2
(45) Date of Patent: Aug. 18, 2009

(54) DISOWNING CACHE ENTRIES ON AGING OUT OF THE ENTRY

(75) Inventors: David S. Hutton, Poughkeepsie, NY (US); Kathryn M. Jackson, Poughkeepsie, NY (US); Keith N. Langston, Woodstock, NY (US); Pak-kin Mak, Poughkeepsie, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 11/339,196

(22) Filed: Jan. 25, 2006

(65) Prior Publication Data
US 2007/0174554 A1  Jul. 26, 2007

(51) Int. Cl.
*G06F 12/00* (2006.01)

(52) U.S. Cl. .................. 711/141; 711/118; 711/119; 711/144; 711/146

(58) Field of Classification Search ......... 711/118–119, 711/122–123, 133, 141, 144, 146, 156
See application file for complete search history.

(56) References Cited

U.S. PATENT DOCUMENTS

| | | | |
|---|---|---|---|
| 5,265,232 A | 11/1993 | Gannon et al. | 395/425 |
| 5,809,526 A | 9/1998 | Patel | |
| 5,926,830 A | 7/1999 | Feiste et al. | 711/122 |
| 5,963,978 A | 10/1999 | Feiste et al. | 711/158 |
| 6,269,425 B1* | 7/2001 | Mounes-Toussi et al. | 711/133 |
| 6,405,322 B1* | 6/2002 | Gaither et al. | 714/5 |
| 6,532,520 B1 | 3/2003 | Dean et al. | 711/133 |
| 6,542,926 B2 | 4/2003 | Zalewski et al. | 709/213 |
| 6,557,084 B2* | 4/2003 | Freerksen et al. | 711/147 |
| 6,658,539 B2* | 12/2003 | Arimilli et al. | 711/141 |
| 6,662,275 B2* | 12/2003 | Arimilli et al. | 711/141 |

(Continued)

FOREIGN PATENT DOCUMENTS

CN  1093961 C  11/2002

(Continued)

*Primary Examiner*—Jasmine Song
(74) *Attorney, Agent, or Firm*—Lynn L. Augspurger; Graham S. Jones, II

(57) ABSTRACT

Portions of data in a processor system are stored in a slower main memory and are transferred to a faster memory comprising a hierarchy of cache structures between one or more processors and the main memory. For a system with shared L2 cache(s) between the processor(s) and the main memory, an individual L1 cache of a processor must first communicate to an associated L2 cache(s), or check with such L2 cache(s), to obtain a copy of a particular line from a given cache location prior to, or upon modification, or appropriation of data at a given cached location. The individual L1 cache further includes provisions for notifying the L2 cache(s) upon determining when the data stored in the particular cache line in the L1 cache has been replaced, and when the particular cache line is disowned by an L1 cache, the L2 cache is updated to change the state of the particular cache line therein from an ownership state of exclusive to a particular identified CPU to an ownership state of exclusive to no CPU, thereby allowing reduction of cross interrogate delays during another processor acquisition of the same cache line.

3 Claims, 3 Drawing Sheets

U.S. PATENT DOCUMENTS

| | | | |
|---|---|---|---|
| 6,715,040 B2 * | 3/2004 | Wang et al. | 711/133 |
| 6,745,292 B1 | 6/2004 | Stevens | 711/129 |
| 6,807,619 B1 | 10/2004 | Ezra et al. | 711/219 |
| 6,826,654 B2 * | 11/2004 | Arimilli et al. | 711/141 |
| 6,851,024 B1 * | 2/2005 | Wilkes et al. | 711/133 |
| 6,868,485 B1 | 3/2005 | Conway | 711/154 |
| 7,039,765 B1 * | 5/2006 | Wilkes | 711/133 |
| 2004/0143712 A1 | 7/2004 | Armstrong et al. | 711/152 |

FOREIGN PATENT DOCUMENTS

JP  2001-034533  9/2001

* cited by examiner

DISOWNING CACHE ENTRIES ON AGING OUT OF THE ENTRY

BACKGROUND

1. Field of the Invention

This invention relates to caching where portions of data are stored in slower main memory and are transferred to a faster memory comprising cache structures between one or more processors and the main memory. For a system with a shared Level 2 (L2) cache(s) memory between the processor(s) and the main memory, an individual L1 cache memory of a processor must first communicate to an associated L2 cache memory system or check with other L2 cache memory systems which may possibly contain a copy of a cache line of data at a given cached location prior to, or upon modification or appropriation of a cache line of data at a given cached location, and includes provisions for notifying the L2 cache memory systems upon determining when the data stored in a particular cache memory location has been replaced.

2. Background Art

In multi-processor systems with a secondary shared cache, e.g., a L2 cache memory, the shared L2 cache memory holds cache lines of data beyond the actual residency of the cache memory in subordinate caches, e.g., a Level 1 (L1) cache memory. This is the value of a secondary L2 cache memory; it contains a superset of all subordinate caches. This reduces traffic from the main memory. Hereinafter, as will be well understood by those skilled in the art, an L1 cache memory may be referred to as an L1 cache and an L2 cache memory may be referred to as an L2 cache; and a cache line of data is referred to as a cache line or a line.

When a processor, e.g., processor A, requests a line for store ("EX" or exclusive request) that line is installed in both the L1 and the L2 caches as exclusive to processor A. When another processor, e.g., processor B, requests the line, processing is elongated if the line is held exclusive to processor A.

However, as is often the case, the central processor A is no longer using the line, and, in fact the line has aged out of the L1 cache and is present only in the L2 cache. Nevertheless, the line is still marked in the L2 cache as being exclusive to the central processor A. Thus extra processing, such as cross investigating and cross invalidating, is required to remove the marking of exclusivity of this line to processor A from the L1 cache and the L2 cache.

In many cases as described here, this line no longer exists in the L1 cache. This unnecessarily elongates the fetch request for another central processor B for the same line, reducing performance. Thus a need exists to speed up this process.

SUMMARY OF THE INVENTION

The method and system described herein provides caching where portions of data are stored in slower main memory and are transferred to faster memory between one or more processors and the main memory. As a general rule, the cache is such that an individual cache system must communicate to other associated cache systems, or check with such cache systems, to determine if they contain a copy of a given cached location prior to or upon modification or appropriation of data at a given cached location. The cache further includes provisions for determining when the data stored in a particular memory location may be replaced.

By way of background, a given line must exist in an L1 cache corresponding to a central processor (CP) to be used by such central processor. Now, when a given line exists in both the L1 cache and the L2 cache, the state of the given line is said to match in both caches. That is, the given line is either marked exclusive or shared, while being modified to the same marked ownership state in both levels. If a given line ages out of the L1 cache and only resides in the L2 cache, then the given line can no longer be in use by the original central processor. More recently used lines have replaced the given line. However, the L2 cache continues to hold the given line in a state of "Exclusive" to the original central processor.

The method and system in accordance with this invention changes the state of the given line in the L2 cache when the given line is to be replaced in the L1 cache. The state of the given line changes from exclusive to a particular identified processor to exclusive to no processor. Thus, in accordance with this invention, when an exclusive line ages out of a particular processor, the line state in the L2 cache will change from exclusive to the particular identified processor to "none", and no cross interrogation or invalidation is necessary when the given cache line is to be returned for a request from any L1 cache, thereby improving overall system performance.

THE FIGURES

DETAILED DESCRIPTION

In accordance with this invention caching is provided where portions of data are stored in a slower main memory and are transferred to a faster memory comprising cache structures between one or more central processors and the slower main memory. For a system with a shared L2 cache(s) between the processor(s) and the main memory, an individual L1 cache or a processor must first communicate to an associated L2 cache memory systems, or check with such other L2 cache systems, to obtain a copy of a given cached location prior to or upon modification or appropriation of data at a given cached location. The cache further includes provisions for notifying the L2 cache systems upon determining when the data stored in a particular cache memory location has been replaced.

As described herein, when exclusive given line ages out of an L1 cache, the L1 cache sends a signal to the L2 cache, indicating that the exclusive given line no longer exists in the L1 cache. This causes the L2 cache to be updated to indicate that the given line is "disowned." That is, the ownership of the given line is changed from that particular central processor to no specific processor. i.e. "unowned."

By way of background, despite improvements in technology, microprocessors are still much faster than main memory. Memory access time is increasingly the bottleneck in overall application performance. As a result, an application might spend a considerable amount of time waiting for data. This not only negatively impacts the overall application performance, but the application cannot benefit much from a processor clock-speed upgrade either.

One way to overcome this problem is to insert a hierarchy of small high-speed buffer memory between the central processor and main memory. Such a buffer is generally referred to as cache memory, or cache for short. Such a hierarchy of buffer or cache is illustrated by an L1 cache 113 and an intermediate L2 cache 121 in FIG. 1.

Figure 1:
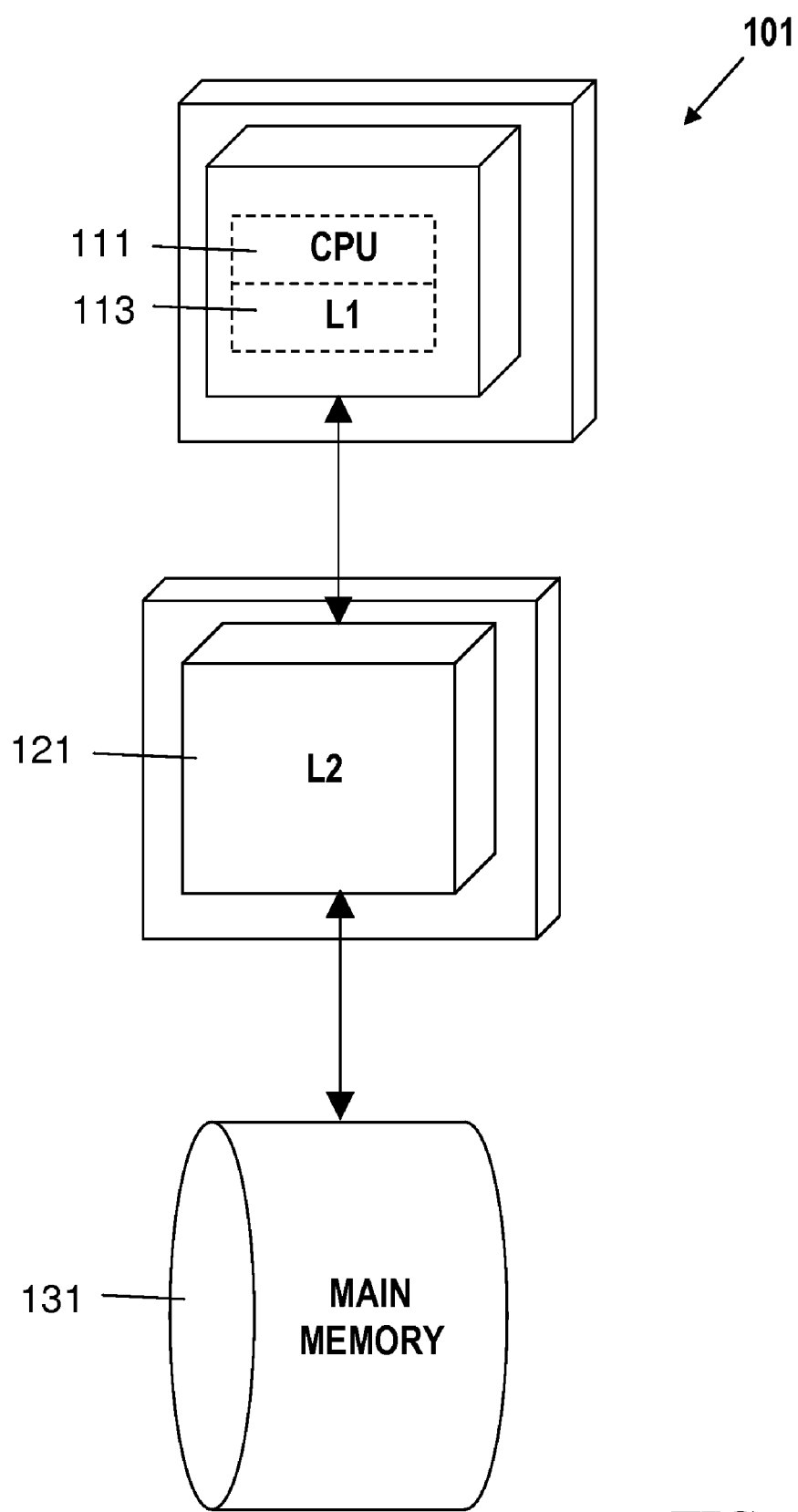
FIG. 1 illustrates a central processor, an L1 cache memory, an L2 cache memory, and a main memory.

FIG. 1 illustrates a central processor system 101 including a central processor 111, an L1 cache 113 which is shown proximate to the central processor 111, an intermediate L2 cache 121 which is shown located in an intermediate position between the central processor 111 and a main memory 131. The application running on the system takes advantage of this enhancement by having the central processor 111 fetch data from the L1 cache 113 instead of the main memory 131. Thanks to the shorter access time to the L1 cache 113, application performance is improved. Of course, there is still traffic between the memory 131 and the L1 cache 113 through the intermediate L2 cache 121, but it is minimal.

The system 101 first copies the data needed by the central processor 111 from main memory 131 into the L2 cache 121, and then from the L2 cache 121 to the L1 cache 113 and from there into a register (not shown) in the processor 111. Storage of results moves data in the opposite direction. First the system copies the data from the central processor 111 into the L1 cache 113, and then from the L2 cache 121. Depending on the cache architecture details, the data is then immediately copied back to the memory 131 (write-through), or deferred (writeback). If an application needs the same data again, data access time is reduced significantly if the data is still in the L1 cache 113 and L2 cache 121 or only the L2 cache 121. To further reduce the cost of memory transfer, more than one element of data is loaded into the cache. The unit of transfer of data is called a cache block or cache line, (referred to herein as a line). Access to a single data element brings an entire line into the cache. The line is guaranteed to contain the element requested.

Latency and bandwidth are two metrics associated with caches and memory. Neither of them is uniform, but each of them is specific to a particular component of the memory hierarchy. The latency is often expressed in central processor cycles or in nanoseconds, while the bandwidth is usually given in megabytes per second or gigabytes per second.

In practice the latency of a memory component is measured as the time it takes to fetch the first portion of a unit of transfer (typically a cache line). As the speed of a component depends on its relative location in the hierarchy, the latency is not uniform. As a rule of thumb, it is safe to say that latency increases when moving from the L1 cache 113 to the L2 cache 121 to the main memory 131.

Some of the memory components, the L1 cache 113 for example, may be physically located in the central processor 111 as shown in FIG. 1. The advantage is that their speed will scale with the central processor clock. It is, therefore, meaningful to express the latency of such components in central processor clock cycles, instead of nanoseconds.

On some microprocessors, the integrated (on-chip) caches, such as the L1 cache 113, do not always run at the speed of the central processor. They operate at a clock rate that is an integer quotient (½, ⅓, and so forth) of the central processor clock.

Cache components external to the processor do not usually, or only partially, benefit from a processor clock upgrade. Their latencies are often given in nanoseconds. Main memory latency is almost always expressed in nanoseconds.

Bandwidth is a measure of the asymptotic speed of a memory component. This number reflects how fast large bulks of data can be moved in and out of the memory component. Just as with latency, the bandwidth is not uniform. Typically, bandwidth decreases the further one moves the memory component away from the central processor 111.

If the number of steps in a data fetch can be reduced, latency is reduced.

Figure 2:
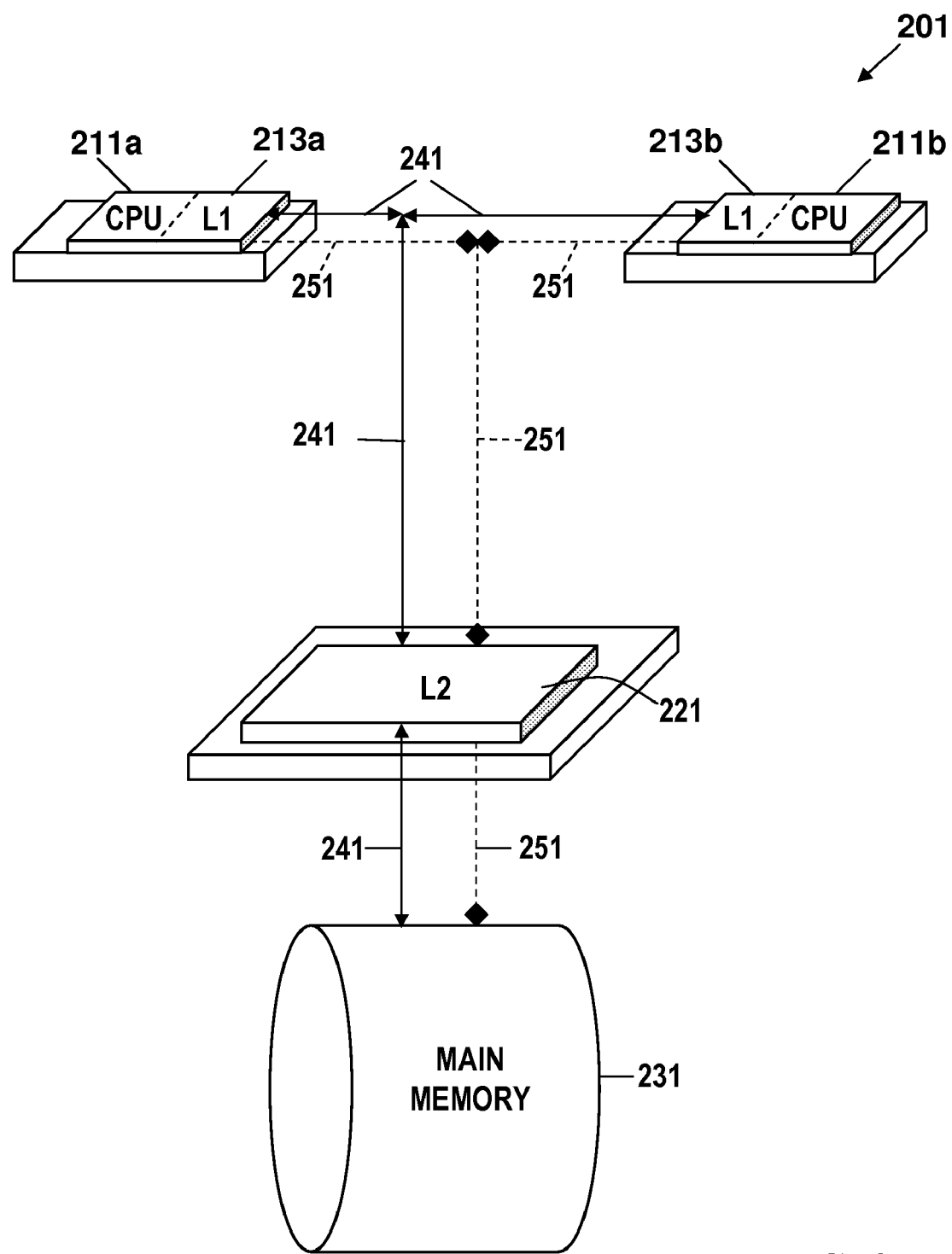
FIG. 2 illustrates a system including two central processors with L1 caches, a shared L2 cache, and a main memory.

FIG. 2 illustrates a system 201 including two central processors including central processor 211*a* with L1 cache 213*a*, and central processor 211*b* with L1 cache 213*b*, a shared L2 cache 221 and a main memory 231. Data lines 241 and control lines 251 perform their normal function. With respect to FIG. 2, when an exclusive given line ages out of an L1 cache 213*a* or L1 cache 213*b*, the L1 cache 213*a* or L1 cache 213*b* sends a signal to the L2 cache 221, indicating that the exclusive given line no longer exists in the L1 cache 213*a* or L1 cache 213*b*. This causes the L2 cache 221 to be updated to indicate that the given line is "disowned." In other words, the ownership of the formerly exclusive given line is changed from the particular central processor 211*a* or 211*b* to "unowned."

Figure 3:
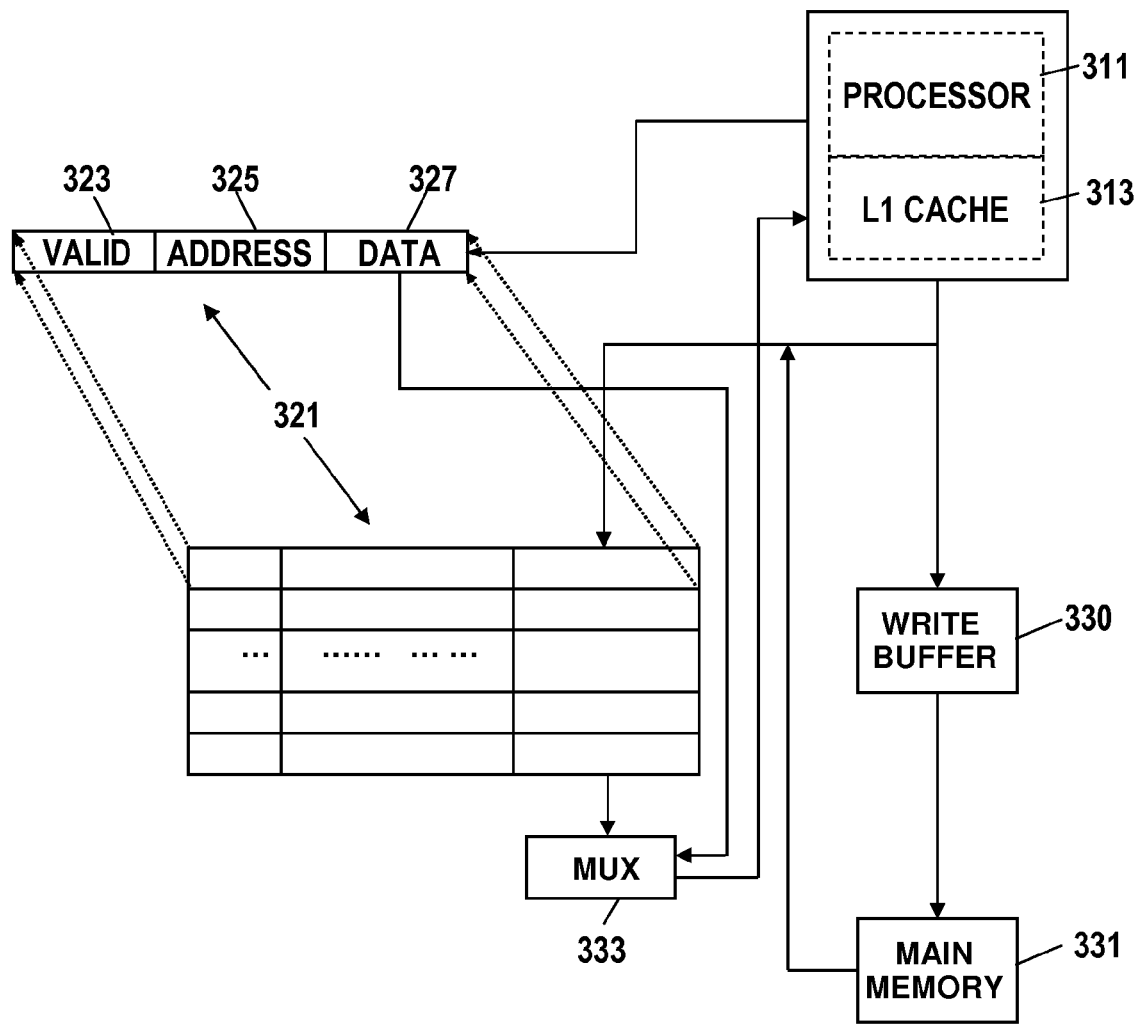
FIG. 3 illustrates a cache, a central processor (CP) unit, and main memory, with control and data lines, and valid, address, and data blocks in an exemplary cache line.

FIG. 3 illustrates components of a system 301 including an L1 cache 313, a central processor (CP) unit 311, an L2 cache 321, a write buffer 330 main memory 331, and a multiplexer (MUX) 333, with control and data lines, and set of valid block 323, address block 325, and data 327 block in an exemplary cache line in the L2 cache 321.

When an exclusive given line ages out of the L1 cache 313, the L1 cache 313 sends a signal to the L2 cache 321, indicating that the given line no longer exists in the L1 cache 313. This causes the L2 cache 321 to be updated to indicate that the given line is "disowned." That is, the ownership is changed from owned by the particular central processor to "unowned."

Consider the cache shown in FIG. 3. The central processor 311 presents a physical address to the L2 cache 321 for tag comparison. The address coming into the L2 cache 321 has two fields, a block address and an offset address, where the block address includes an address tag and indications of a cache index, as well as control data.

The cache index selects the tag to be tested to be see if the desired block is in the L2 cache 321. The next step is index selection. In the case of direct mapping, the data is read and sent to the central processor 311 in parallel with the tag being read and checked.

After reading the tag from the L2 cache 321, it is compared to the tag portion of the block address from the central processor 311. To be sure that the tag and the data line both contain valid information, the validity data (as exclusive to a central processor or "unowned") must be read and verified. If the cache data is valid, the central processor 311 is signaled to load the data from the L2 cache 321.

In the case of a write, the data is also written to a write buffer, for writing to main memory.

In the case of a cache miss, the L1 cache 313 sends a stall signal to the central processor 311, and a read to L2 cache 321 and then to the main memory 331. Reading from the main memory 331 replaces a selected line in the caches e.g., typically the least recently used line, including the data, the tags, and the validity information.

According to the method and system of the invention, when an exclusive given line ages out of an L1 cache, and the L1 cache sends a signal to the L2 cache, this indicates that the given line no longer exists in the L1 cache, thereby causing the L2 cache to be updated to indicate that the given line is "disowned." That is, the ownership of the given line is changed from the particular central processor to "unowned."

The embodiment of FIG. 2 improves performance by reducing and in some cases even eliminating cross interrogate processing. Eliminating cross interrogate processing avoids sending a cross interrogate to an L1 cache 213*a* or an L1 cache 213*b* for a given line that, due to an L1 cache replacement or age out replacement and that given line no longer exists in the L1 cache 213*a* or the L1 cache 213*b*. This results in a shorter latency when another central processor requests a line which may be the given line, and thereby avoids a fruitless directory lookup at the other L1 cache which had once owned the given line.

Additionally, eliminating cross interrogate processing avoids sending a cross invalidate to an L1 cache 213a or an L1 cache 213b for a given line that is to be replaced in the L2 cache 221. Ordinarily, when a given line ages out of the L2 cache 221, that given line must also be invalidated in the L1 cache 213a or the L1 cache 213b. This maintains a subset rule between the L1 cache 213a or the L1 cache 213b and the L2 cache 221. These two invalidates disrupt normal processing at the L1 cache 213a or the L1 cache 213b. If the given line no longer exists in the L1 cache 213a or the L1 cache 213b, this disruption is unnecessary and impacts performance negatively.

While the method and system have been described with respect to exclusive lines, it is to be understood that the method and system described herein also avoids cross interrogates and cross invalidates for shared lines when one updates an L2 cache directory 221 for shared lines that age out of the L1 cache 211a or the L1 cache 211b.

If a shared cache implementation maintains a separate bit for each central processor to identify which L1 caches "hold the line", each time a given line ages out of the L1 cache 211a or the L1 cache 211b, the respective "CP holds the line" bit in the L2 cache 221 could be reset. Cross interrogates and cross invalidates need to be performed only to CP's having their "CP (CP) holds line" bit active. If all bits are inactive, all cross interrogates and cross invalidates are avoided. In this way, L2 cache 221 age out replacements avoid unnecessary cross invalidates to the L1 cache 213a or the L1 cache 213b. This too improves performance by avoiding unnecessary disruptions at the L1 cache 213a or the L1 cache 213b.

A further aspect of the invention is a program product comprising computer readable program code to configure and control a computer system. The computer system comprises a plurality of microprocessors, where each microprocessor has an associated L1 cache 213a or an L1 cache 213b, an L2 cache 221 associated to the L1 cache 213a and the L1 cache 213b, and a main memory 231. The program product causes the caches to store portions of data for transfer to and from the microprocessors and the main memory, and further to cause an individual cache communicating to other associated caches to check with the other caches, to determine whether they contain a copy of a given cached location prior to reading data from, reading data to, or modifying cached data. The computer code also determines when the data stored in a particular cache memory location may be replaced.

Specifically, the computer code writes changes to the state of the line in the L2 cache when the given line is to be replaced in the L1 cache, and also changes the state of the given line from exclusive to a particular identified processor to exclusive to no processor.

While the invention has been described with certain preferred embodiments and exemplifications, it is not intended to limit the scope of the invention thereby, but solely by the claims appended hereto.

We claim:

1. A data caching method comprising:
   storing portions of data in slower main memory associated with at least one Central Processing Unit (CPU) comprising a processor or a microprocessor;
   transferring data to and from a faster memory comprising a cache memory structure located between at least one CPU and said main memory; with said cache structure further comprising an individual L1 cache memory communicating first to an associated L2 cache memory to check said associated L2 cache memory, to obtain a copy of a particular cache line of data at a given L2 cache location prior to reading data from, reading data to, or modifying cached data at said given L2 cache location;
   providing for each previously stored cache line in said L2 cache memory to have an ownership state exclusive to a particular identified CPU or an ownership state of exclusive to no CPU;
   determining when a given previously stored cache line in said L2 cache no longer exists in a particular L1 cache memory location with any ownership state; and
   then sending a signal to said associated L2 cache memory indicating that said ownership=state of said given previously stored cache line in said L1 cache memory has changed from an state of exclusive to a particular identified CPU to an ownership state of exclusive to no CPU with said L2 cache memory thereby being updated to indicate that said given previously stored cache line in said L2 cache is disowned;
   whereby no cross interrogation or invalidation is necessary when said given cache line is to be returned for a request from any L1 cache, thereby improving overall system performance.

2. The data caching method of claim 1 comprising signaling changes to the state of a said previously stored line in said L1 cache memory to said associated L2 cache memory when said previously stored line in said L1 cache memory ages out and is to be replaced in the said L1 cache memory.

3. The data caching method of claim 2 comprising changing the state of said line in said L1 cache memory from exclusive to unowned.

* * * * *